3,090,838

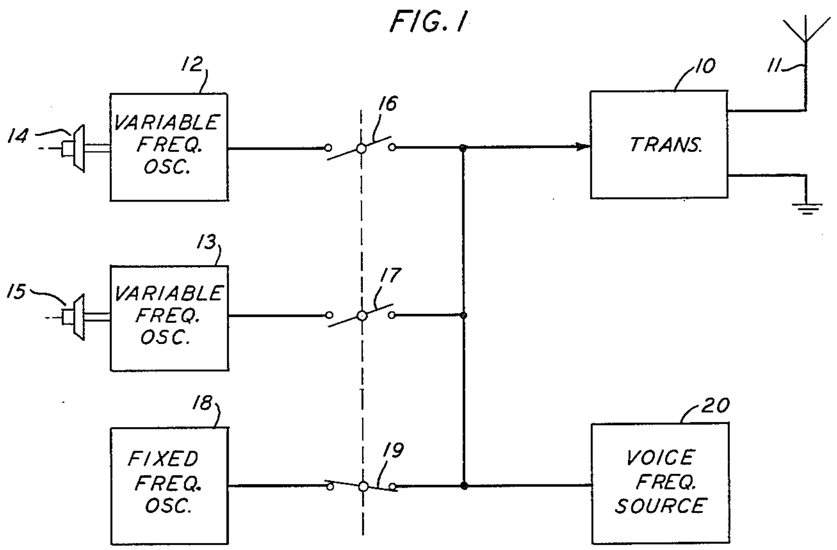
FIG. 2
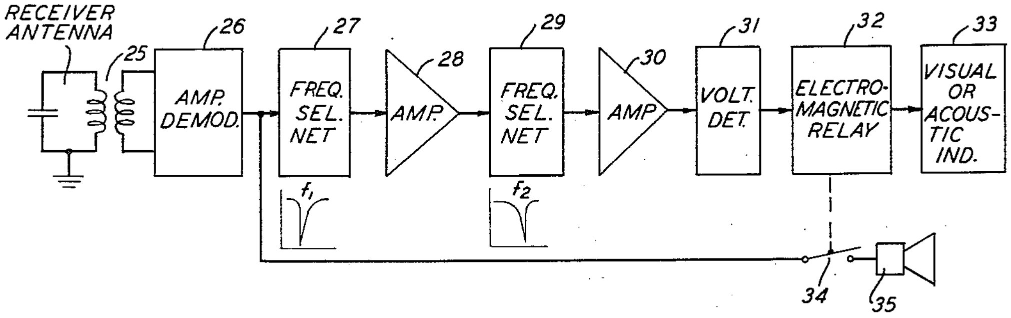
FIG. 3
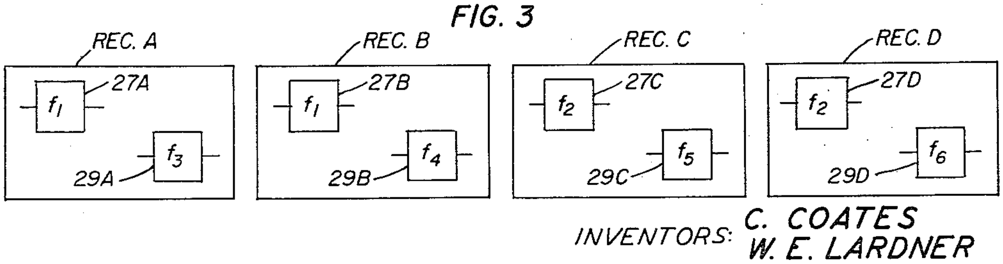
INVENTORS: C. COATES
W. E. LARDNER
BY Patrick J. Roche
ATTORNEY United States Patent Office 3,090,838 Patented May 21, 1963

SELECTIVE SIGNALING SYSTEM

Colin Coates, Oxhey, Watford, and William E. Lardner, Harrow Weald, England, assignors to Westrex Company, Limited, London, England Filed Apr. 15, 1958, Ser. No. 728,673
11 Claims. (Cl. 179—84)

This invention relates to electric selective calling systems.

Selective calling systems are known in which one or more tones, which may be within the audio range, are transmitted to select one out of a plurality of receivers to receive a message. These selective calling systems may be used in a telephone system in which communication is over fixed lines, in a radio communication between a fixed station and a number of vehicles, or an inductive system in which a loop antenna surrounds a building and persons within the building carry the receivers. Thus there are known mobile radio telephone systems comprising a central transmitter and a plurality of mobile receivers carried by persons or vehicles, each receiver being provided with a plurality of vibrating reeds tuned to different frequencies, which may be within the audio range. When the central transmitter desires to call a particular mobile receiver, it transmits the frequencies to which the vibrating reeds at that mobile station will respond, and closure of contacts by these reeds completes the circuit of an indicator, optical or acoustic. Verbal messages may then be passed between the two stations.

In the known systems the selection of a receiver has always been by the transmission of the tones allotted to that receiver. In accordance with the present invention the selection of a desired receiver is by absence of effective calling signals at the receiver and not the presence of signals. This enables a number of advantages to be obtained, any or all of which may be gained depending upon the particular circumstances. These advantages are as follows:

(*a*) The receiver will indicate when the transmitter fails, or ceases to transmit, or when the receiver has been moved out of range of the transmitter. The receiver will indicate continuously in the absence of a signal.

(*b*) Frequency selective networks used in the receivers can be made to have as high a selectivity as desired. A large number of calling tones may be obtained within a narrow frequency band.

(*c*) The receivers cannot be operated by interfering signals, such as speech, since they are operated by the absence of signals.

(*d*) It is possible to send a call simultaneously to all receivers, say, in emergency.

(*e*) When two or more calling tones are allocated to select individual receivers, it is possible to call simultaneously a group of receivers to which one frequency has been allotted in common.

In a preferred embodiment of the invention each receiver is provided with one or more frequency selective networks each of which is arranged to attenuate a certain audio frequency. There is normally transmitted from the transmitter a holding signal which is within the pass range accepted by the receiver but outside the range of all the frequency selective networks. Each receiver is provided with an indicator which is prevented from indicating by receipt of a holding signal or other signal transmitted through its frequency selective networks. To call a given receiver, there are transmitted the tones which will be rejected by the frequency responsive networks of that receiver, and the holding signal is interrupted. At the desired receiver, the frequency selective networks prevent those tones from reaching the indicator, and in the absence of the holding signal, the indicator of that receiver will respond. At all other receivers, at least one of these tones will pass through the frequency selective networks thereat to hold the indicators thereof non-operative. There should, of course, be no interval between the transmission of the holding signal and the other signals.

The invention will be better understood from the following detailed description with reference to the accompanying drawings, in which:

FIG. 1 illustrates diagrammatically one embodiment of a radio transmitter according to the present invention and FIG. 2 illustrates diagrammatically one embodiment of a radio receiver in accordance with the invention.

FIG. 3 illustrates diagrammatically a plurality of radio receivers arranged according to the present invention to provide a system wherein it is possible to call simultaneously a group of receivers to which one frequency has been alloted in common.

Referring now to the drawings, in FIG. 1, 10 is a radio transmitter of any suitable conventional form coupled to antenna 11. The output of the transmitter may be amplitude modulated or frequency modulated, and the antenna 11 may comprise a dipole of, say, the fixed control station of a mobile vehicle radio system, or the antenna may comprise an inductive loop for communicating with mobile receivers located within the area bounded by the loop.

The variable oscillators 12 and 13 may be set by switches 14 and 15 respectively to generate oscillations of desired frequencies within the audio range, say 200 c./s. to 5 kc./s. The oscillators 12 and 13 may be of any suitable form which will permit selection of frequencies. They may include tuned reeds, or may have preset components that are selected by switches 14 and 15. Oscillators 12 and 13 may be connected by switches 16 and 17 respectively to the input to the transmitter 10. Oscillator 18 generates a holding signal, preferably of a frequency that will not be reproduced by the receiver, say 50 c./s. or 6 kc./s., and is normally coupled by switch 19 to the input to transmitter 10. Microphone 20 is also connected to the input to transmitter 10.

It is important that there be no interval between cessation of the transmission of the holding signal from oscillator 18 and the commencement of the audio frequency tones from oscillators 12 and 13. Either therefore the switch 19 must be distinct from the switch 16 and the switch 17 and must be operated manually or automatically in such way that there will be a slight overlap in the transmission of the different signals, or else all these switches may comprise different contacts of the one multiple switch which is arranged so that one contact shall be made before another is broken.

The output of the transmitter 10 will therefore always comprise either the tones generated by oscillators 12 and 13, or the holding signal from oscillator 18. It may also include speech at the same time as the holding signal.

In the receiver shown in FIG. 2, receiving antenna 25 is coupled to the amplifier and demodulator 26. The device 26 may comprise suitable conventional circuits which produce an audio frequency output from the received waves. The antenna 25 may comprise a dipole fixed to a vehicle in the case of a mobile vehicle radio system, or a ferrite rod. The output from amplifier-demodulator 26 is applied to the path consisting of the first frequency selective network 27, amplifier 28, second frequency selective network 29, amplifier 30, voltage sensitive detector 31, relay 32 and visual and/or acoustic indicator 33. The acoustic indicator may include an oscillator as tone generator. The relay 32 may comprise an electromagnetic relay, or a thermionic tube or transistor circuit. The first frequency selective network 27 is arranged to produce an infinite attenuation for one, $f_1$, of the two signals allocated to that particular receiver, and the second frequency selective network 29 is arranged to produce an infinite attenuation of the other, $f_2$, of these two audio frequency signals. The relay 32 when operated may close switch 34 to cause the output of the amplifier-demodulator 26 to be applied to the reproducer 35, switch 34 having means for holding it closed until it is reset.

In operation, at the transmitter shown in FIG. 1, switch 19 is normally closed and switches 16 and 17 are open. The holding signal from oscillator 18 is now transmitted to all the receivers. At each of the receivers, the output of the amplifier-demodulator 26 will comprise this holding signal. The holding signal is arranged to be of a frequency, that will not interfere with the reception of speech, but it is within the pass range of the receiver amplifiers 28 and 30. The holding signal is of a different frequency to the selecting tones so that it will not be rejected by any of the frequency selective networks 27 and 29. When the holding signal is received, therefore, it will pass through frequency selecting network 27, amplifier 28, frequency selecting network 29, amplifier 30 to the voltage sensitive detector 31. The detector 31 is arranged to operate the relay 32 and/or lamp 33 when the output of the amplifier 30 falls below a specified level. This level will depend upon the distortion and noise transmitted through the frequency selective networks 27 and 29 and the permissible signal level variation from the amplifier-demodulator 26.

In order now to call the receiver shown in FIG. 2, oscillator 12 is set to generate a tone of frequency $f_1$ and oscillator 13 is set to generate a tone of frequency $f_2$. Switches 16 and 17 are now closed and switch 19 opened. Tones $f_1$ and $f_2$ are included in the output of the transmitter 10 from antenna 11 and are received by the receiving antenna 25. The output from amplifier-demodulator 26 will now comprise tones $f_1$ and $f_2$ only. Tone $f_1$ will be attenuated by frequency selective network 27, and tone $f_2$ will be attenuated by frequency selective network 29, so that no signal will pass through amplifier 30, detector 31 and relay 32. Indicator 33 will operate and contact 34 will close so that a spoken message can be reproduced by reproducer 35.

When the tones $f_1$ and $f_2$ have been transmitted for a sufficient time, at the transmitter, FIG. 1, switch 19 is closed and switches 16 and 17 are opened. The holding signal will again be transmitted. Instead of switch 34 controlled by relay 32, there may be employed the switchhook of the normal telephone set, or another contact requiring manual operation by the person alerted.

When it is desired to call another receiver from the transmitter, oscillators 12 and 13 will be set to produce another frequency combination, for example tones $f_1$ and $f_3$. In the receiver circuit shown in FIG. 2, frequency selective network 27 will attenuate tone $f_1$, but neither frequency selective network 27 or 28 will attenuate tone $f_3$, and hence this receiver will not be alerted. If, however, switches 16 and 17 at the transmitter are arranged so that they may be operated individually, then by transmitting one frequency alone, say tone $f_1$, there will be alerted that group of receivers which have a frequency selective network that will attenuate this one frequency, whereas the remaining receivers will be held silent by this one frequency. The holding signal will always be transmitted as an accompaniment of speech, to hold all the receiving selectors silent, and hence it will be impossible for speech to cause undesired alerting of a receiver.

Such a system is illustrated in FIG. 3, wherein each of receivers A and B includes frequency selective networks 27A and 27B respectively, each tuned to frequency $f_1$, and each of receivers C and D includes frequency selective networks 27C and 27D, each tuned to frequency $f_2$ different from frequency $f_1$. Networks 27A, 27B, 27C and 27D are similar to network 27 of FIG. 2, and are each arranged to attenuate the frequency to which they are tuned and pass all other frequencies.

According to such a system, receivers A and B may be called by transmitting frequency $f_1$, while receivers C and D may be called by transmitting frequency $f_2$. It is thus possible to call a plurality of receivers comprising one group of a plurality of groups of receivers by transmitting a frequency corresponding to the common frequency of the receivers in the group. If each receiver includes in addition a second frequency selective network, such as networks 29A, 29B, 29C, 29D shown in FIG. 3, each tuned to a different frequency, it is also still possible to call each receiver individually by transmitting its appropriate calling frequency.

The frequency selective networks 27, 29, can be of any known type having a substantial attenuation at one frequency, for example bridges or bridged T circuits. The selectivity of the receivers will depend upon the gain of the amplifiers 28 and 30. By using sufficient gain, a large number of selecting tones may be used within a narrow frequency band, and therefore for many applications it may be sufficient to employ one selecting tone only, with one frequency selective circuit in each receiver. Use of two or more selecting tones, however, in addition to increasing the number of receivers that may be used, also enables group selection.

The selectivity of the system will also depend upon the amount of harmonic distortion present in the signal, for the frequency selective networks will attenuate only the fundamental frequency. It would of course be possible to provide a second rejector circuit to remove the second harmonic, but this will not generally be necessary.

In the event of, say, an emergency arising, when all receivers are to be alerted, it is only necessary to cut off the outputs of both tone generators 12 and 13 and also the holding signal generator 18. Since none of the receivers will receive a signal, their visual indicators, and local acoustic signal generators, if provided, will all respond. Similarly, if the system is required for a purpose in which it is necessary that persons at the receivers shall know whether or not they are in touch with the transmitter, as for example in aircraft control, a breakdown at the transmitter will cause all receivers to be continuously alerted. Also, in systems, such as inductive systems within a building, in which a receiver may inadvertently be moved outside the range of the transmitter, this will be indicated by continuous alerting of the receiver.

Although it has not been illustrated in the drawings, provision may be made for two-way communication, and in fact each station may be provided with a transmitter as shown in FIG. 1 for calling the other stations, and a receiver as shown in FIG. 2 for receiving calls from the other stations.

While in the system described above the selecting tones and the holding signal are transmitted as modulation of a carrier, this is not essential to the invention, but, in cases such as inductive systems, or in telephony over fixed wires, the selecting tones and holding signal may be transmitted over audio signal paths. Thus, in place of the amplifier-demodulator 26, any other source of the audio-frequency tones and control signal may be used. In particular, the invention may be employed for establishing communication between telephone exchanges and/or subscribers, when, if the receiver has its own power supply, an indication will be given of system failure. Also, while the invention has been described above in conjunction with the transmission of messages, it may in fact be employed for any purpose in which a selecting operation is to be performed, such as in the remote control of switches. Further, the various devices to be selectively controlled may be different portions of the same apparatus.

It is not essential that the selecting tones be within the audio frequency range, but in, for instance, a telephone system in a mine in which a fixed transmitter and mobile receivers carried by mine locomotives are inductively coupled to a conductor extending through the mine galleries, the selecting and holding frequencies may be within the long wave radio band.

The holding signal could, if desired, itself be used for signaling, for instance, pulses of holding signal could be transmitted with the selecting tones to cause intermittent operation of the receiver indicated at the selected station, which will permit an alerted person to distinguish between an intended call and a transmitter failure.

What is claimed is:

1. A selective signaling system comprising a transmitter and a plurality of receivers, means at said transmitter for producing a signal of particular frequency, means at said transmitter for producing a plurality of signals of frequencies different from each other and from said particular frequency for identifying discrete receivers, means at said transmitter for alternately rendering said particular signal means or said different signal means effective to transmit the respective particular or different signals to said receivers, and frequency selective means at each of said receivers to pass said particular signal received thereat to produce an output signal with at least a predetermined level for simultaneously establishing non-operative conditions in all said frequency selective receivers, said means at said receivers identified by one of said different signals selectively rejecting said one different signal received thereat to produce an output signal with a level less than said predetermined level of said particular signal for selectively changing the non-operative condition at each of said receivers to an operative condition, said receivers normally being operative in the absence of signals of said particular frequency.

2. A selective signaling system comprising a transmitter and a plurality of groups of receivers, means at said transmitter for producing a signal of particular frequency, means at said transmitter for producing a plurality of signals of frequencies different from each other and from said particular frequency, each different signal identifying one of said receiver groups, means at said transmitter for alternately transmitting said particular signal or one of said different signals, and frequency selective means in each receiver of each of said receiver groups to pass said particular signal to produce an output signal at a predetermined level for simultaneously establishing a non-operative condition in all receivers of all said receiver groups, said frequency selective receiver means of each receiver of one of said receiver groups selectively rejecting one of said different signals received thereat to produce an output signal with a level less than said predetermined level of said particular signal for changing the non-operative condition of each receiver of one of said receiver groups into an operative condition, said receivers normally being operative in the absence of signals of said particular frequency.

3. A selective signaling system comprising a transmitter and at least one receiver, means at said transmitter for alternately transmitting a signal of a particular frequency or two other signals having frequencies different from each other and from said particular frequency, and frequency selective means at said receiver to pass said particular signal received thereat to produce an output signal with at least a predetermined level for establishing a non-operative condition in said receiver, said receiver means rejecting said two other signals received thereat to produce an output signal with a level less than said predetermined level of said particular signal for changing the non-operative condition of said receiver to an operative condition, said receiver normally being operative in the absence of signals of said particular frequency.

4. The signaling system according to claim 4 in which said frequency selective receiver means includes filtering means having a preselected frequency versus attenuation characteristic for passing said particular signal substantially without attenuation thereby passing said last-mentioned signal to produce an output signal with said predetermined level, said filtering means having a further preselected frequency versus attenuation characteristic for passing said two other signals with substantial attenuation thereby rejecting said last-mentioned two other signals to produce an output signal with a level less than said predetermined level of said particular signal.

5. The signaling system according to claim 4 in which said receiver means includes additional means connected to the output of said filtering means and controlled by the predetermined-level output signal thereof for establishing said non-operative condition in said receiver, said additional means being further controlled by the less-than-predetermined level output signal of said filtering means for changing the non-operative condition of said receiver into an operative condition.

6. The signaling system according to claim 5 in which said transmitter includes voice-signaling means permanently connected thereto, and said receiver means also includes voice-reproducing means connected to said additional means and rendered non-operative thereby in response to the predetermined level output of said filtering means for establishing said non-operative condition in said receiver, said voice-reproducing means being changed from said non-operative condition to said operative condition by said additional means in response to said less-than-predetermined level output of said filtering means.

7. The signaling system according to claim 6 in which said receiver means includes a visual or audible indicator also connected to said additional means, said indicator being non-activated by said additional means in response to the predetermined-level output signal of said filtering means for showing the non-operative condition of said voice-reproducing means, said indicator being activated by said additional means in response to the less-than-predetermined level output signal of said filtering means for showing the operative condition of said voice-reproducing means.

8. A selective signaling system comprising a transmitter and a plurality of receivers, means at said transmitter normally effective to apply a first signal to said transmitter for transmission to receivers, means at each of said receivers for passing said first signal received thereat to produce an output signal with a predetermined level for effectively disabling all said receivers, means at said transmitter for disabling said first-mentioned means thereby to prevent the transmission of said first signal, and means instantaneously operative at said transmitter when said first-mentioned means is disabled for selectively applying any one pair of a plurality of pairs of other signals to said transmitter for calling one of said receivers, said means at one of said receivers selectively rejecting said last-mentioned one pair of said other signals to produce an output signal with a level reduced below said predetermined level of said first signal for effectively calling said one receiver by changing said last-mentioned receiver from said disabled condition to an activated condition, said receivers normally being operative in the absence of signals of said particular frequency.

9. The system according to claim 8 in which said means at each of said receivers includes two filter networks connected in tandem, each of said filter networks being provided with a preselected frequency versus attenuation characteristic which is different from that of each of the other filter networks, said two filter networks at each of said receivers passing said first signal to produce an output signal having substantially said predetermined level for disabling said receivers, each of said two filter networks at said one receiver selectively passing one signal of said one pair of said other signals substantially with no attenuation while passing the other signal of the same pair of said other signals substantially with maximum attenuation thereby rejecting said one pair of said other signals to produce an output signal having a level reduced below said predetermined level of said first signal thereby calling said one receiver by changing said last-mentioned one receiver from the disabled condition to said activated condition.

10. The system according to claim 9 in which each of said receiver means includes means connected to the output of said tandem-connected filter networks and controlled by said predetermined level output thereof for simultaneously disabling all said receivers, said last-mentioned means at said one receiver being further controlled by said level reduced below said predetermined level output of said tandem-connected filter networks therein for calling said one receiver by changing said disabled condition thereof to said activated condition.

11. The system according to claim 10 in which said transmitter includes voice-signaling means permanently connected thereto, and each of said receivers includes a voice-reproducing means and a visual or audible indicator connected to the output of said controlled means connected to each of said receivers, said voice-reproducing means and associated indicator being disabled by said predetermined-level output of said tandem-connected filter networks being applied to said controlled means connected to said receivers, said voice-reproducing means and associated indicator of said one receiver means being changed from said disabled condition to said activated condition by said level reduced below said predetermined output of said tandem-connected filter networks being applied to said controlled means connected thereto in said last-mentioned one receiver.

References Cited in the file of this patent

UNITED STATES PATENTS

| | | |
|---|---|---|
| 2,145,053 | Meszar | Jan. 24, 1939 |
| 2,293,869 | Vaughan | Aug. 25, 1942 |
| 2,513,342 | Marshall | July 4, 1950 |
| 2,658,112 | Davison | Nov. 3, 1953 |
| 2,677,014 | Moynihan | Apr. 27, 1954 |
| 2,749,390 | Lewinter | June 5, 1956 |
| 2,817,828 | McGuigan | Dec. 24, 1957 |